(12) United States Patent
Kim

(10) Patent No.: US 9,215,916 B2
(45) Date of Patent: Dec. 22, 2015

(54) PROTECTIVE COVER FOR SUPPORTING MOBILE TERMINAL IN DUAL DIRECTION AND MULTI ANGLE

(71) Applicant: Samsung Electronics Co., Ltd., Gyeonggi-do (KR)

(72) Inventor: Namsu Kim, Seoul (KR)

(73) Assignee: Samsung Electronics Co., Ltd., Yeongtong-gu, Suwon-si, Gyeonggi-do (KR)

( * ) Notice: Subject to any disclaimer, the term of this patent is extended or adjusted under 35 U.S.C. 154(b) by 0 days.

(21) Appl. No.: 14/013,564

(22) Filed: Aug. 29, 2013

(65) Prior Publication Data
US 2014/0061071 A1    Mar. 6, 2014

(30) Foreign Application Priority Data
Aug. 29, 2012    (KR) .................. 10-2012-0094618

(51) Int. Cl.
*A45C 11/00* (2006.01)
*G06F 1/16* (2006.01)
*A45C 13/02* (2006.01)

(52) U.S. Cl.
CPC ............... *A45C 11/00* (2013.01); *G06F 1/166* (2013.01); *A45C 2011/003* (2013.01); *A45C 2013/025* (2013.01); *A45C 2200/15* (2013.01); *G06F 2200/1633* (2013.01)

(58) Field of Classification Search
CPC ...... B65D 5/52; B65D 5/5206; B65D 5/5213; G06F 1/1626; G06F 1/1628; G06F 1/1633; G06F 1/1637; G06F 1/1641; A45C 2013/025; A47B 23/04; A47B 23/041; A47B 23/042; A47B 23/043; A47B 23/044; A47B 97/08
USPC .......... 206/45.2, 45.23, 45.24, 320, 576, 764, 206/751, 752, 754, 755, 748; 248/450, 455, 248/458, 459, 460, 465, 454
See application file for complete search history.

(56) References Cited

U.S. PATENT DOCUMENTS

| 8,143,982 B1 | 3/2012 | Lauder et al. |
| 8,659,893 B2 * | 2/2014 | Chiou ...................... 361/679.55 |
| 8,915,357 B2 * | 12/2014 | Mecchella ................ 206/45.23 |
| 2011/0259788 A1 | 10/2011 | Zeliff et al. |
| 2011/0260014 A1 * | 10/2011 | Chen ............................. 248/157 |

FOREIGN PATENT DOCUMENTS

EP    2 369 439 A2    9/2011

* cited by examiner

*Primary Examiner* — Steven A. Reynolds
*Assistant Examiner* — Javier A Pagan
(74) *Attorney, Agent, or Firm* — Cha & Reiter, LLC.

(57) ABSTRACT

A protective cover of a mobile terminal is provided. The protective cover for supporting a mobile terminal in a dual direction and a multi angle includes: the protective cover for housing the mobile terminal at the inside; and a support sheet mounted in a recess formed at an outer surface of the protective cover and spread based on a groove line formed in a lattice and having a portion close contacting with the protective cover and having the remaining portions spread from the protection cover and contacting with the ground and for supporting the mobile terminal. Thereby, by supporting the mobile terminal in various heights and angles using an auxiliary card, the mobile terminal can be supported in a multi direction and a multi angle.

21 Claims, 14 Drawing Sheets

FIG. 1
(PRIOR ART)
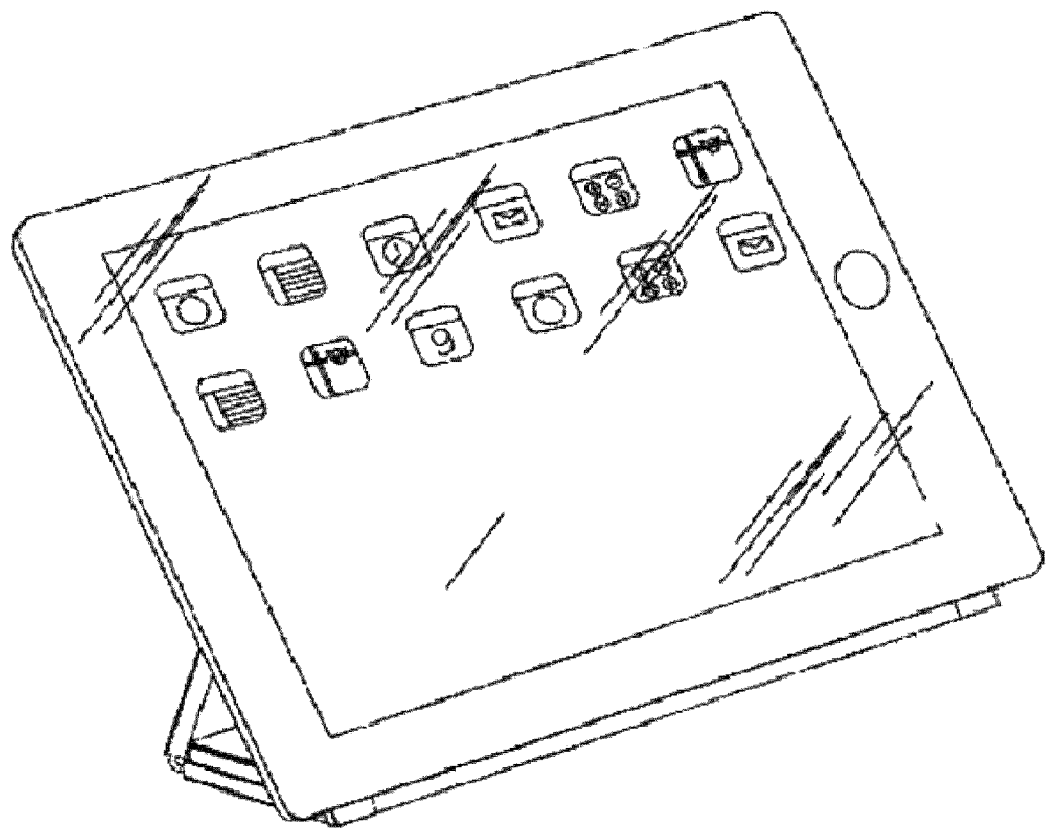
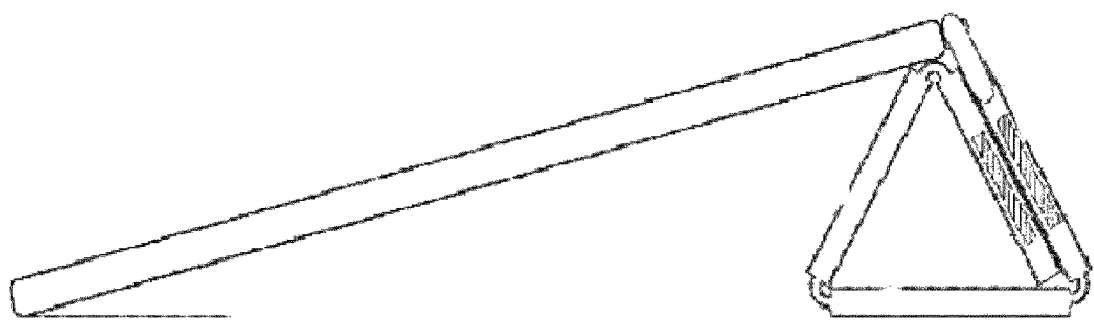

PROTECTIVE COVER FOR SUPPORTING MOBILE TERMINAL IN DUAL DIRECTION AND MULTI ANGLE

CLAIM OF PRIORITY

This application claims the benefit of priority under 35 U.S.C. §119(a) from a Korean patent application filed on Aug. 29, 2012 in the Korean Intellectual Property Office and assigned Serial No. 10-2012-0094618, the entire disclosure of which is hereby incorporated by reference.

BACKGROUND

1. Field of the Invention

The present disclosure relates to a protective cover, and more particularly, to a protective cover having a support sheet for supporting a mobile terminal in a dual direction and a multi angle.

2. Description of the Related Art

In general, a tablet personal computer (PC), which is one non-limiting example of a mobile terminal, is manipulated using a touch screen instead of mounting a keyboard or a mouse. The tablet PC is less convenient for work applications than a netbook computer or a laptop computer, but has excellent portability when compared to a netbook computer or a laptop computer. As a result, demand of students or office workers for the tablet PC has arisen.

Examples of available tablet PCs include the Galaxy Tab of Samsung Electronics, iPad of Apple Inc., Identity tab of Korean corporation, KT, BlackBerry Playbook of RIM, Slate of Hewlett-Packard, Folio 100 of Toshiba, Asus Eeepad of Asus, i-station Z3D of Korean corporation, I-STATION of Digital Cube Corp., and Optimus pad of LG Electronics.

As many functions are gradually converged in the tablet PC, users perform a function of DMB broadcasting viewing, moving picture reproduction, image viewing, and photographing through the tablet PC. The tablet PC has been used for an input of characters or typing through a virtual keyboard displayed on a touch screen, drawing of a picture using a stylus touch pen, or reading of an E-book.

As the tablet PC typically has a large display, a weight of the tablet PC increases and it is inconvenient to use the tablet PC while carrying for a long time. Because the tablet PC has a panel shape of an exposed display, when carrying the tablet PC, the display may be easily broken. Therefore, a support that can support the tablet PC for user convenience and stable portability and storage has been developed.

Because an angle and direction that ergonomically support the tablet PC according to use in which a user uses the tablet PC is not fixed to a single angle and direction, the tablet PC support should be able to variously change a support angle and direction. Further, an angle and direction that support the tablet PC should be able to be appropriately changed according to a user's preference.

For example, when the user views multimedia through the tablet PC, the tablet PC support should support the tablet PC in a horizontal direction, but it may be ergonomically optimal to the user to support the tablet PC while maintaining a relatively high and oblique angle to the ground. In contrast, when typing or when drawing on a touch panel, the tablet PC support should be supported in a vertical direction, but it may be offset to have a harmful influence on a repeated operation of the user by supporting the tablet PC while maintaining a relatively low and oblique angle to the ground. U.S. Pat. No. 8,143,982, herein incorporated by reference in its entirety, discloses a foldable accessory apparatus attached and detached to and from a tablet PC using an internal magnetic element and that can be folded in an overlapped form as a support, as shown in FIG. 1

However, because the foldable accessory apparatus fixed to the tablet PC can be folded in only one direction, the foldable accessory apparatus has a structure that supports the tablet PC in only one direction and one angle and thus a limitation exists in supporting the tablet PC in various angles and directions.

Further, because the foldable accessory apparatus is attached and detached to and from the tablet PC using a magnetic element, the magnetic element may have a harmful influence on operating the tablet PC.

Further, in order to attach the foldable accessory apparatus to the tablet PC, a separate connection device is necessary and is protruded to the outside and thus may disfigure an external appearance design of a main body of the tablet PC and increase a weight thereof.

Therefore, a support apparatus that can change and support the mobile terminal in a multi direction and a multi angle according to various use while having no influence on operation of the mobile terminal and that can easily store and conveniently carry when not using the mobile terminal is requested.

SUMMARY

The present invention has been made at least in part in view of the above problems, and provides a protective cover for supporting the mobile terminal in a dual direction and a multi angle that can support the mobile terminal in various angles and directions according to a user's usage and preference.

The present disclosure further provides a protective cover for supporting the mobile terminal in a dual direction and a multi angle that has minimal, if any, electrical influence on the mobile terminal upon operating the mobile terminal by attaching and detaching a support sheet to and from the mobile terminal or by using a support sheet in the mobile terminal.

The present disclosure further provides a protective cover for supporting the mobile terminal in a dual direction and a multi angle formed with a support pad formed in a lattice cells having a simple structure and manipulation convenience and that can be easily produced, easily carried and economically used.

In accordance with an aspect of the present invention, a protective cover for supporting a mobile terminal in a dual direction and a multi angle includes: the protective cover for housing the mobile terminal inside; and a support sheet mounted in a recess formed in an outer surface of the protective cover and spread based on a groove line formed in a lattice and having a portion close contacting with the protective cover and having the remaining portions spread from the protection cover and contacting with the ground and for supporting the mobile terminal.

BRIEF DESCRIPTION OF THE DRAWINGS

The above features and advantages of the present invention will be more apparent from the following detailed description in conjunction with the accompanying drawings, in which:

FIG. 1 is a perspective view illustrating a conventional tablet support;

DETAILED DESCRIPTION

Figure 2:
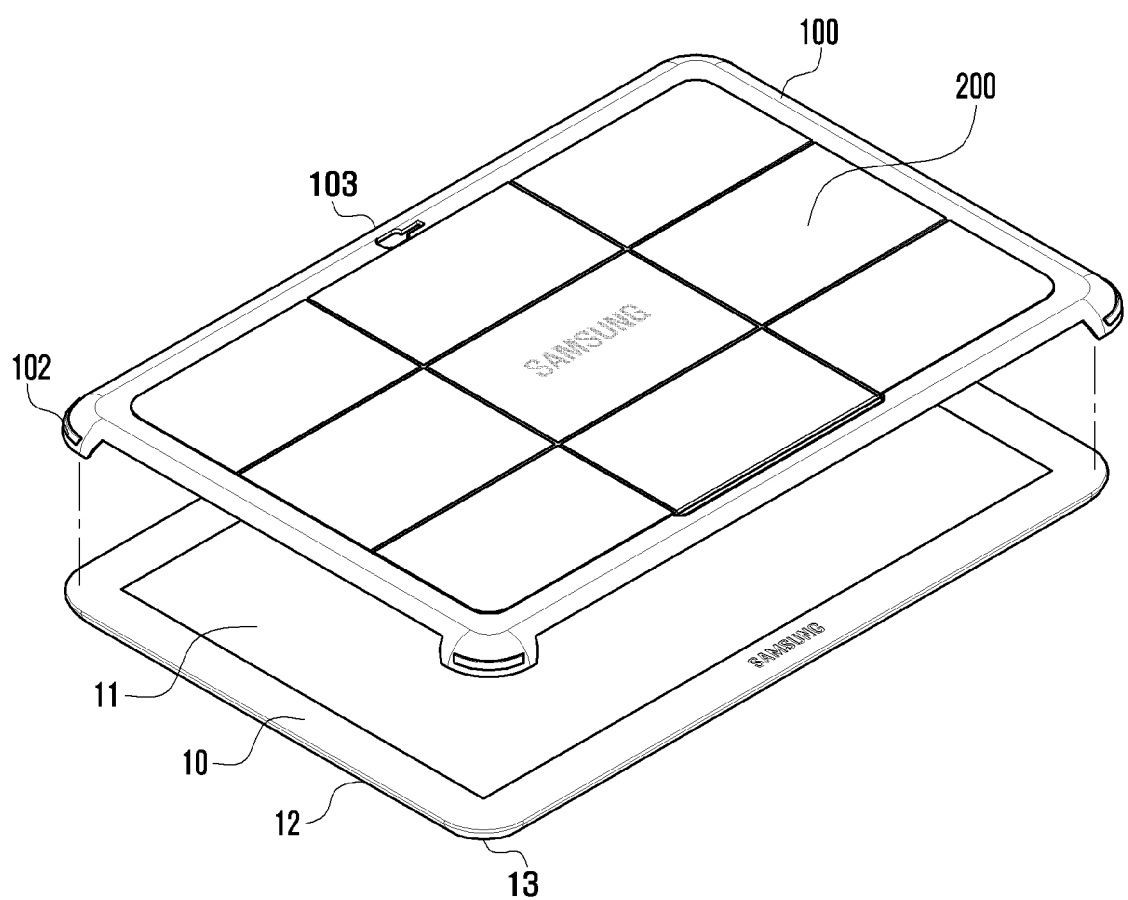
FIG. 2 is a perspective view illustrating a separated structure before fastening a protective cover for supporting the mobile terminal in a dual direction and a multi angle to the mobile terminal according to an exemplary embodiment of the present invention.

Hereinafter, exemplary embodiments of the present invention are described in detail with reference to the accompanying drawings. The same reference numbers are used throughout the drawings to refer to the same or like parts. The views in the drawings are schematic views only, and are not intended to be to scale or correctly proportioned. For the purposes of clarity and simplicity, detailed descriptions of well-known functions and structures incorporated herein may be omitted to avoid obscuring the subject matter of the present invention.

A protective cover of the mobile terminal according to an exemplary embodiment of the present invention has a self stand function and thus does not require a separate stand, and functions as a dual direction stand and a multi angle stand. Particularly, a protective cover for supporting in a dual direction and a multi angle of the present exemplary embodiment performs a self stand function while not increasing the size of a protective cover for protecting the mobile terminal and is a convenient protective cover when storing and using the mobile terminal.

In an exemplary embodiment of the present invention, the mobile terminal indicates various mobile terminals including a tablet PC.

Figure 3:
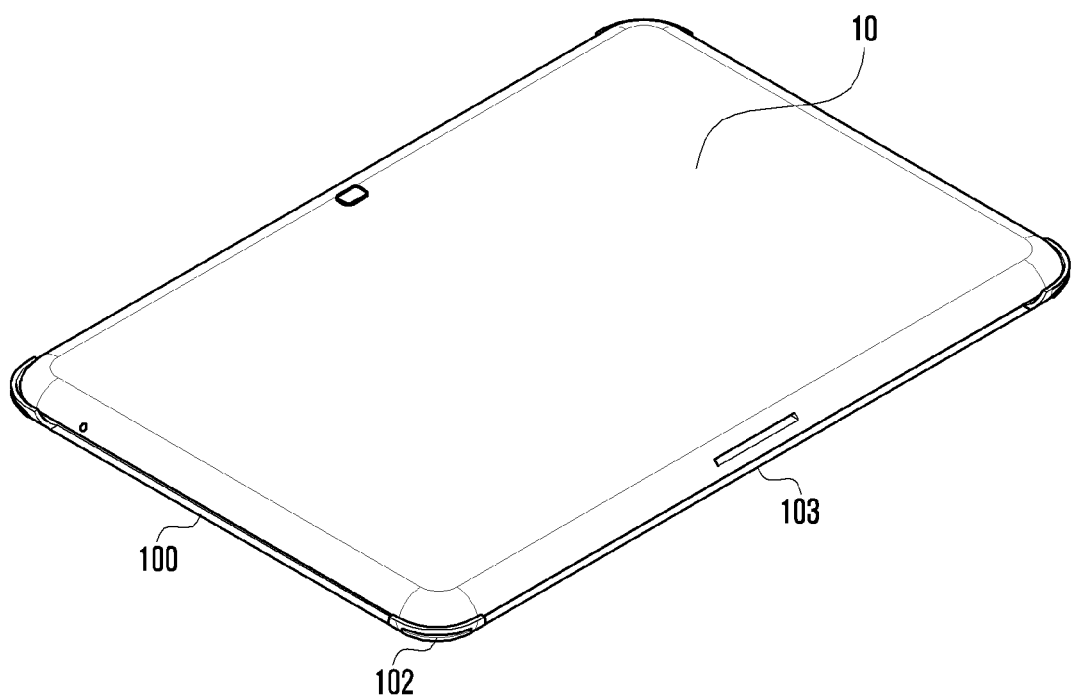
FIG. 3 is a perspective view illustrating a state in which a protective cover close contacts with and is attached to a display, which is a front surface of the mobile terminal.

FIG. 2 is a perspective view illustrating a separated structure before fastening a protective cover for supporting the mobile terminal in a dual direction and a multi angle to the mobile terminal according to an exemplary embodiment of the present invention. FIG. 3 is a perspective view illustrating a state in which a protective cover attached to a display, being the front surface of the mobile terminal.

Referring to FIGS. 2 and 3, a protective cover 100 according to the present exemplary embodiment preferably at a front surface 11 of the mobile terminal 10 is coupled to the mobile terminal 10, thereby protecting the mobile terminal 10. A corner portion 102 of the protective cover 100 is protruded, and a front end portion 103 thereof is bent upward to enclose a side surface 12 and a side surface corner 13 of the mobile terminal 10, thereby preventing the protective cover 100 from moving in a state in which the protective cover 100 covers a front surface 12 or a rear surface of the mobile terminal 10. The mobile terminal 10 and the protective cover 100 may be detached or fastened by detaching or attaching the corner portions 102 thereof by applying a predetermined force, but a structure of fastening or detaching the protective cover 100 and the mobile terminal 10 is not limited thereto.

Figure 4:
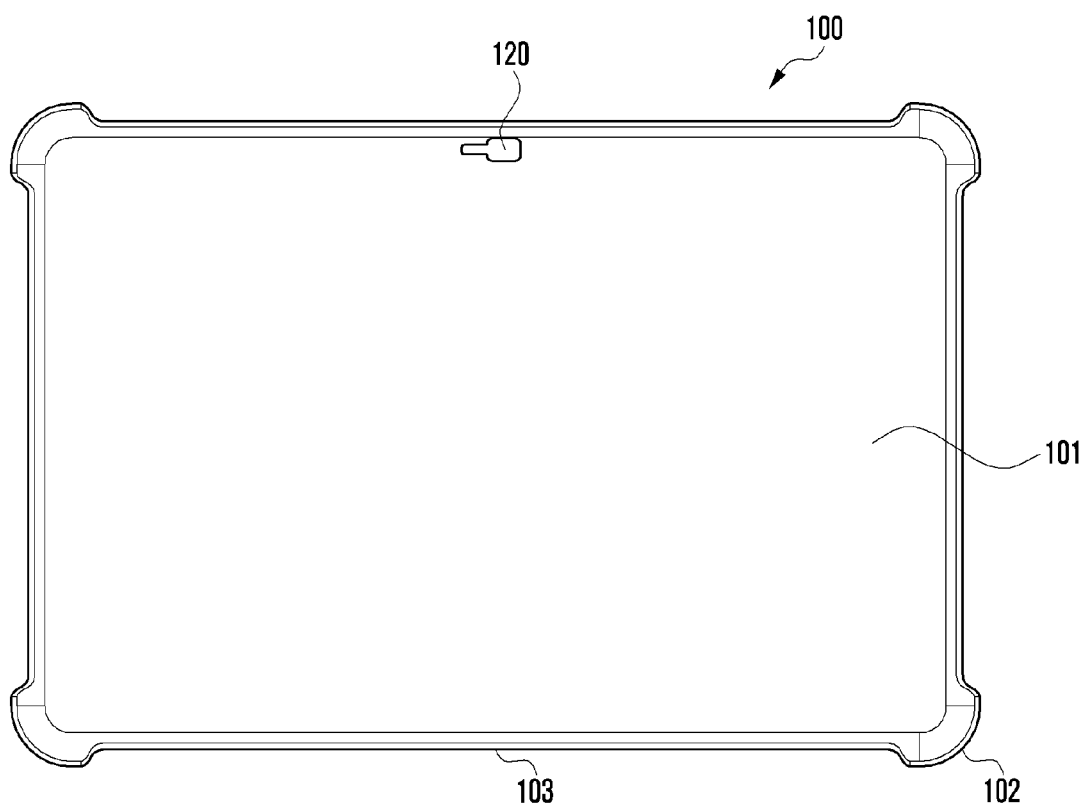
FIG. 4 is a front view illustrating a protective cover for supporting in a dual direction and a multi angle of FIG. 2.
Figure 5:
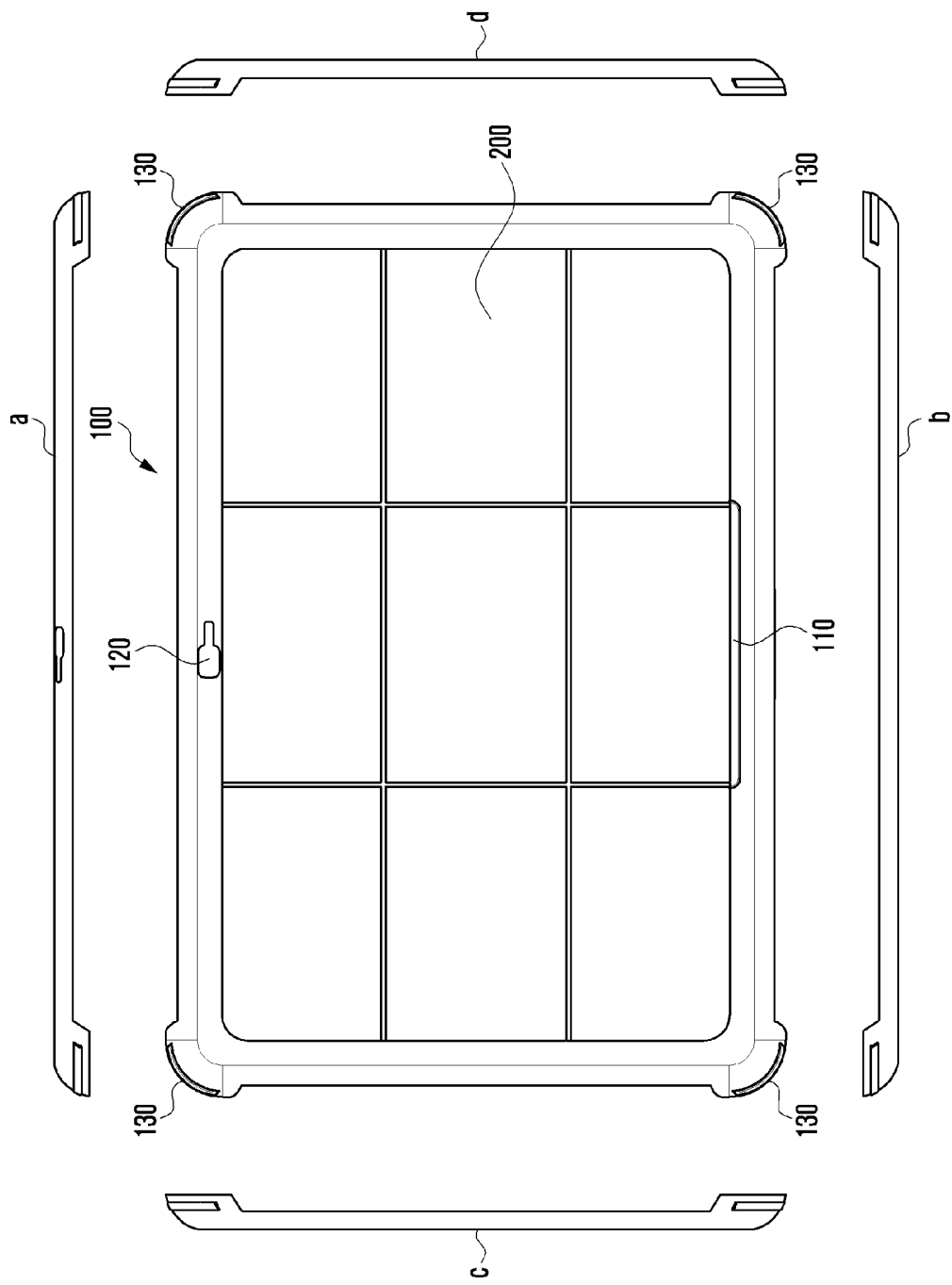
FIG. 5 is a view illustrating a rear surface, side surface, upper surface, and lower surface of a protective cover for supporting in a dual direction and a multi angle of FIG. 2.

FIG. 4 is a front view illustrating a protective cover 100 for supporting in a dual direction and a multi angle of FIG. 2, and FIG. 5 is a diagram illustrating a rear surface, side surfaces c and d, an upper surface a, and lower surface b of a protective cover for supporting in a dual direction and a multi angle of FIG. 2.

Referring to FIGS. 4 and 5, a front surface 101 of the protective cover 100 for supporting in a dual direction and a multi angle according to the present exemplary embodiment is formed in a size that can house the mobile terminal 10, and a corner portion 102 thereof is protruded to enclose the side surface corner 13 and a front surface 11 of the mobile terminal 10, and a front end portion 103 thereof is partially bent.

Referring to FIG. 4, the protective cover 100 may be made of a hard material such as plastic. In a preferred embodiment, at least a portion of the front surface 101 may be formed with a material such as a soft material (e.g., chamois, synthetic leather, suede and microfiber), such that when the front surface 11 of the mobile terminal 10 rubs or otherwise contacts the front surface 101 of the protective cover 100, the surface of the display, it is protected from scratching and/or, abrasion.

Referring to FIG. 5, the protective cover 100 for supporting in a dual direction and a multi angle according to an embodiment includes a recess for housing a support sheet 200 in a predetermined area of a rear surface of the protective cover 100 and an auxiliary groove 110 for close contacting the support sheet 200 with a recess or for spreading the support sheet 200 from the recess. The auxiliary groove 110 is preferably included between an edge surface of the support sheet 200 and the protective cover 100 to allow for easy manipulation of the support sheet 200.

When the protective cover 100 is fastened to the mobile terminal 10, the protective cover 100 may further include a camera groove 120 for exposing a camera of the mobile terminal 10. A corner pad 130 is typically positioned on an edge portion of the protective cover 100 to relieve an impact by a collision and also to prevent any sliding. The corner pad 130 may be made of, for example rubber, silicon or any other elastic material.

The recess is preferably the same thickness, length and width with the support sheet 200 to ensure that the support sheet 200 does not protrude beyond the surface of the protective cover 100.

Figure 6:
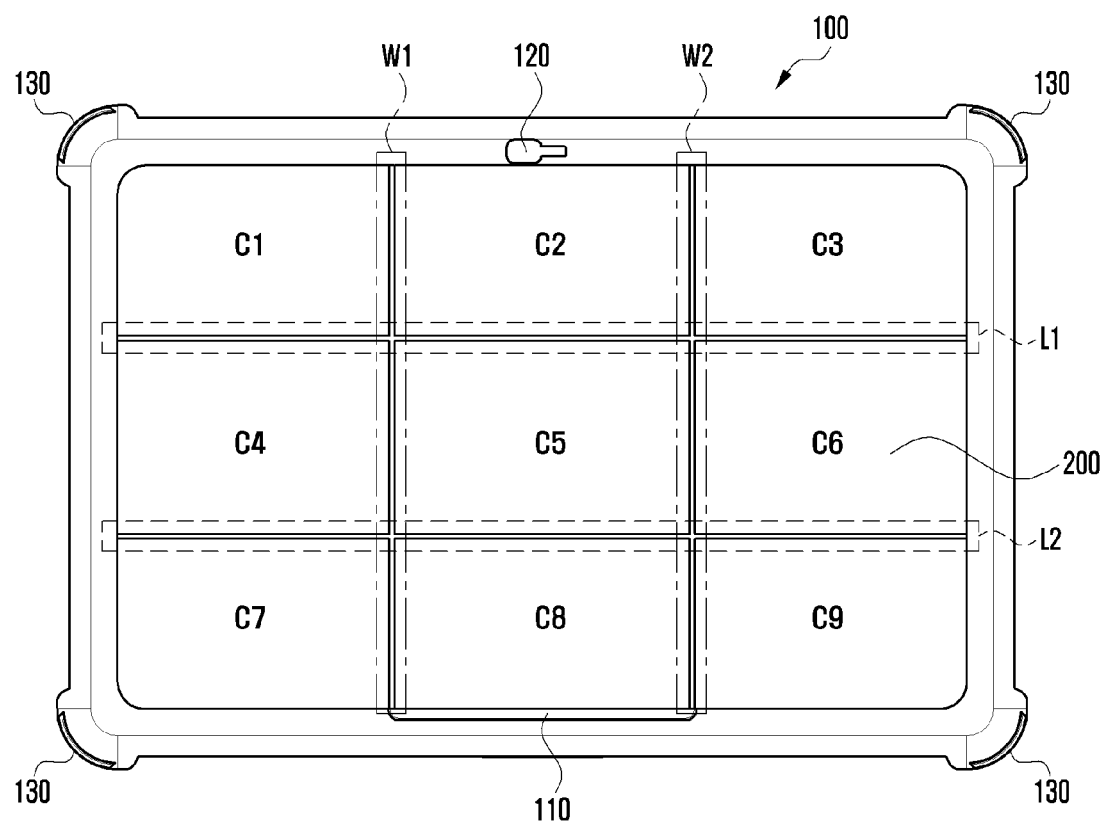
FIG. 6 is a front view illustrating a support sheet mounted in a protective cover for supporting in a dual direction and a multi angle of FIG. 2.

FIG. 6 is a front view illustrating a support sheet mounted in a protective cover for supporting in a dual direction and a multi angle of FIG. 2.

Referring to FIG. 6, the support sheet 200 according to an exemplary embodiment contacts with and is mounted in a recess recessed to a predetermined depth at a rear surface of the protective cover 100. The support sheet 200 may include a plurality of lattice cells C1-C9 divided by groove lines W1, W2, L1, and L2 engraved in a lattice at a surface of the support sheet 200. More particularly, a plurality of lattice cells C1-C9 indicate divided areas of the support sheet 200 when dividing the support sheet 200 by groove lines W1, W2, L1, and L2.

The groove lines W1, W2, L1, and L2 are formed in a lattice shape, but preferably include a first width groove line L1 and a second width groove line L2 formed in a horizontal direction and separated and engraved by a predetermined gap in a width direction, and may include a first length groove line W1 and a second length groove line W2 formed in a vertical direction and separated and engraved by a predetermined gap in a length direction intersecting the width direction. In the present exemplary embodiment, two lines each are suggested as a width groove line and a length groove line, but the number is not limited thereto.

A gap between the first width groove line L1 and the second width groove line L2 or a gap between the first length groove line W1 and the second length groove line W2 may be the same or may be different, but may be produced in any height or angle.

The groove lines W1, W2, L1, and L2 are formed as folding lines acting as living hinges for when the support sheet 200 is partially folded away from the mobile terminal 10 as herein described. For example, when a portion of the support sheet 200 is separated from the recess at the first width groove line L1, a remaining portion of the support sheet 200 remains in contact with the recess, such that the separating portion can support the mobile terminal 10. More particularly, when the support sheet 200 is folded along first width groove line L1, lattice cells C1-C3 remain in the recess and lattice cells C4-C9 are removed from the recess. As a result, lattice cells C4-C9 form a support portion, propping the mobile terminal 10 up at an angle.

The entire set of lattice cells C1-C9 close flatly with the recess, and in this embodiment divided into lattice cells C1-C3 disposed at an upper portion and lattice cells C4-C9 disposed at a lower portion based on the first width groove line L1. The lattice cells C1-C3 disposed at an upper portion remain in the recess, and the lattice cells C4-C9 disposed at a lower portion are, spread from the recess and contact with the surface below the mobile terminal 10.

Because lattice cells C1-C3 remain in the recess, the support sheet 200 is still fixed to the protective cover 100. In the present exemplary embodiment, an example of attaching and fixing the first lattice cell C1 to the recess is illustrated, but another lattice cell or a plurality of lattice cells may be fixed to the recess, and as an attaching method, various methods such as bonding, a double-sided tape, and fastening by an unevenness structure may be used.

A support sheet according to an exemplary embodiment of the present invention preferably has very little electrical and/ or physical influence on operation of a tablet PC by fastening, except for magnetism when detaching and attaching from and to the mobile terminal.

Hereinafter, a structure and method in which a protective cover according to an exemplary embodiment of the present invention supports the mobile terminal in a predetermined angle are described in detail with reference to FIGS. 7 to 10.

Figure 7:
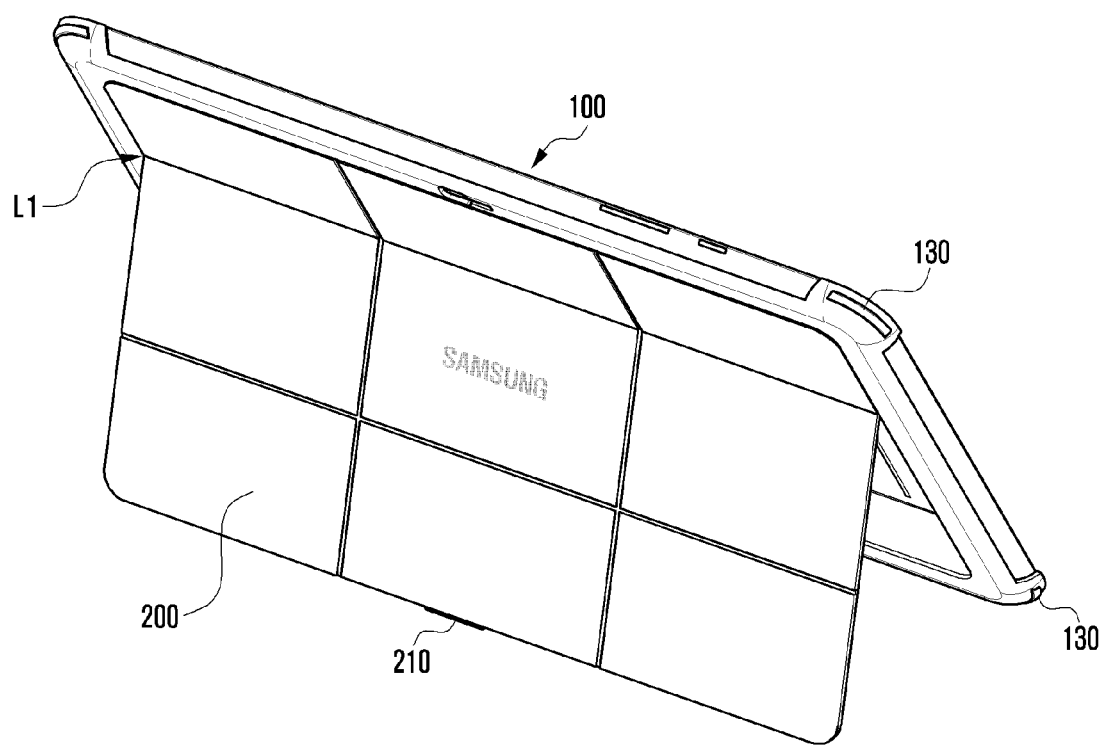
FIG. 7 is a perspective view illustrating a state in which a support sheet supports a mobile terminal in a predetermined angle, seen at the rear surface of the protective cover of FIG. 2.
Figure 8:
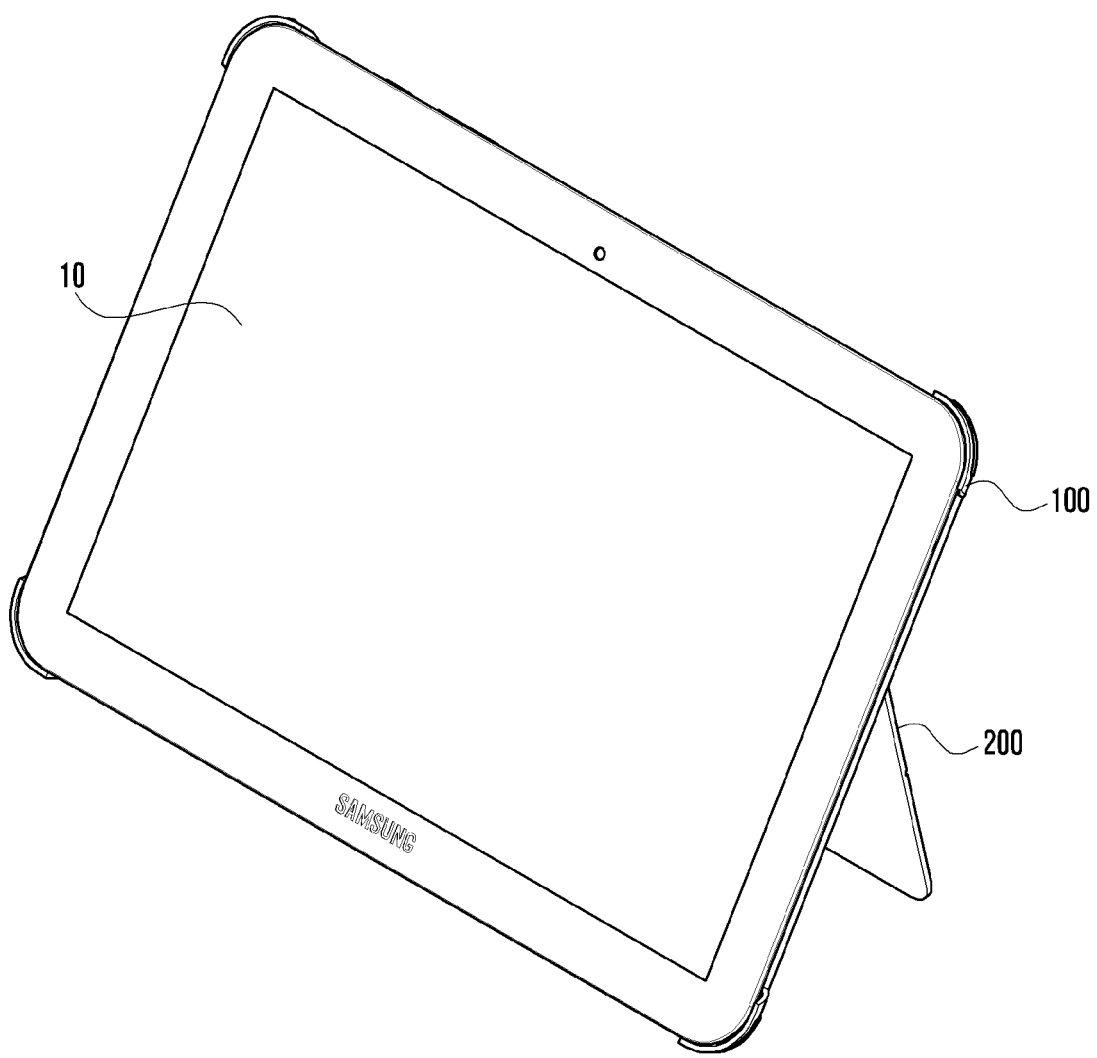
FIG. 8 is a perspective view illustrating a state in which a support sheet supports the mobile terminal at a predetermined angle, seen at the front surface of the protective cover of FIG. 2.

FIG. 7 is a perspective view illustrating a state in which a support sheet supports a mobile terminal at a predetermined angle, seen at the rear surface of the protective cover of FIG. 2, and FIG. 8 is a perspective view illustrating a state in which a support sheet supports the mobile terminal at a predetermined angle, seen at the front surface of the protective cover of FIG. 2.

Referring to FIGS. 7 and 8, a display, which is a front surface of the mobile terminal 10 is exposed, and to the rear surface of the mobile terminal 10 is fastened the front surface of the protective cover 100. When a user uses the mobile terminal 10, the mobile terminal 10 is fastened to the protective cover 100. In contrast, when the user stores and carries the mobile terminal 10, a front surface of the mobile terminal 10 may be fastened to a front surface of the protective cover 100.

A portion of the support sheet 200 is preferably spread or separated from the recess based on one groove line. As a result, a number of lattice cells remain in the recess, and the remaining lattice cells are separated from the recess to support the mobile terminal 10, at the predetermined angle.

For example, when the support sheet 200 is spread based on the first width groove line L1, as described above, the support sheet 200 is divided into upper lattice cells C1-C3 and lower lattice cells C4-C9. The upper lattice cells C1-C3 remain in the recess, and the lower lattice cells C4-C9 are separated from the recess. A portion of an edge of the lower lattice cells C4-C9 separated from the recess contacts the surface below the mobile terminal 100. More particularly, an edge of the support sheet defined by a line along lattice cells C7-C9 contacts the surface below the mobile terminal 10.

Therefore, the upper lattice cells C1-C3 remain in contact with the protective cover 100, and the lower lattice cells C4-C9 simultaneously support the mobile terminal 10 at a predetermined angle and thus the support sheet 200 obliquely supports the mobile terminal 10. The support sheet 200 supports the mobile terminal 10 by spreading based on the first width groove line L1, thereby supporting the mobile terminal 10 in a horizontal direction.

In this embodiment, an angle of the mobile terminal 10 supported by the support sheet 200 may be adjusted according to an amount which the lower lattice cells C4-C9 are spread from the recess. That is, as the lower lattice cells C4-C9 are less spread from the recess, the mobile terminal 10 may be supported to an angle adjacent to vertical to the ground, and as the lower lattice cells C4-C9 are much spread from the recess, the mobile terminal 10 may be supported in an angle adjacent to the ground. More particularly, as the edge of the support sheet 200 defined by the line common to lattice cells C7-C9 is moved further from the mobile terminal 10, the angle at which the display of the mobile terminal 10 is positioned decreases.

The support sheet 200 may be formed with a material that integrally encloses the plurality of lattice cells C1-C9 and the groove lines L1 and L2, W1, and W2. The material is preferably made of one of rubber, urethane, silicon, leather, synthetic leather, add fiber. The material of the support sheet 200 additionally preferably includes a pad or thickened areas at the inside corresponding to the plurality of lattice cells C1-C9. In this embodiment, because the only the lattice cells are defined by the thickened areas, the spaces between the lattice cells forms, the groove lines L1, L2, W1, and W2.

The pad may be made of a hard material that can support a weight of the mobile terminal 10 in which the support sheet 200 is housed in the protective cover 100. The support sheet 200 may further include rubber 210 for performing a function of a pad for relieving an impact and preventing being pushed in a portion of an edge contacting with the surface below the mobile terminal 10.

FIGS. 7 and 8 illustrate an example in which the support sheet 200 is separated based on the first width groove line L1, but the support sheet 200 may be separated based on the second width groove line L2 according to a height to support the mobile terminal 10. At least one of the width groove lines L1 and L2 may be formed according to an exemplary embodiment without limitation of the number.

Figure 9:
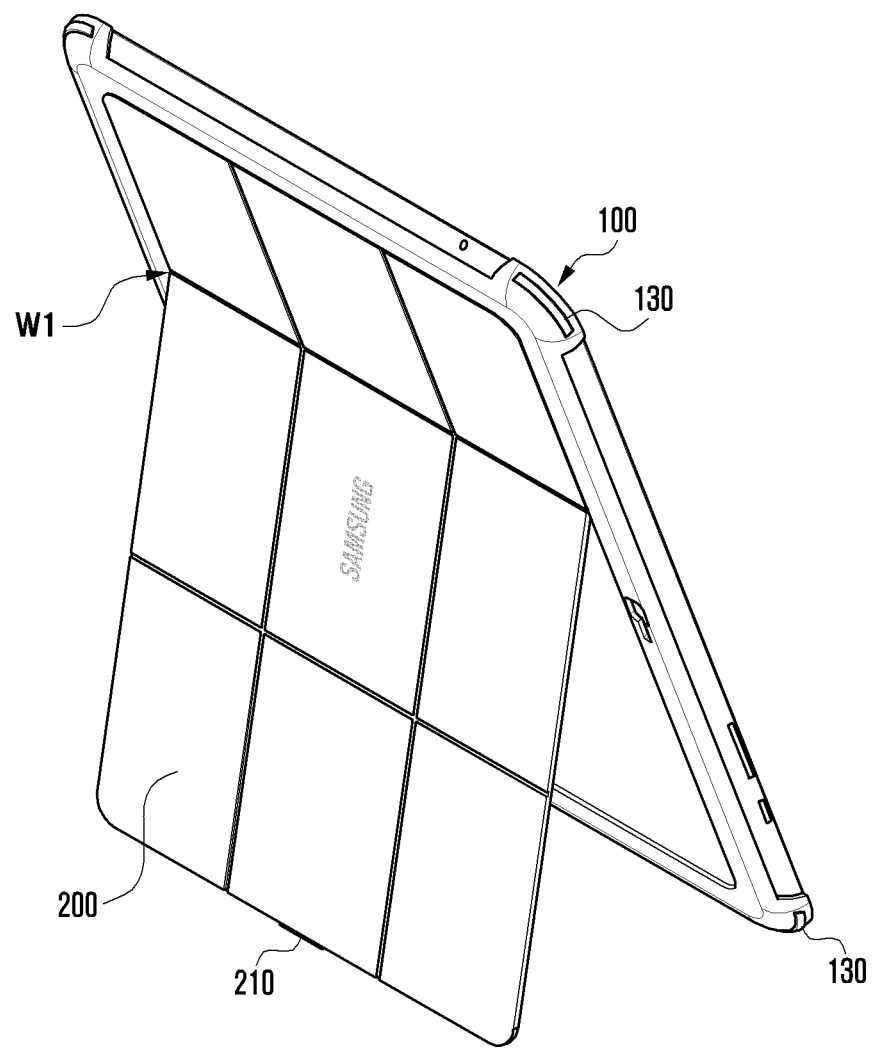
FIG. 9 is a perspective view illustrating a state that supports the mobile terminal when a support sheet is spread based on a first length groove line, seen at the rear side of the protective cover of FIG. 7.
Figure 10:
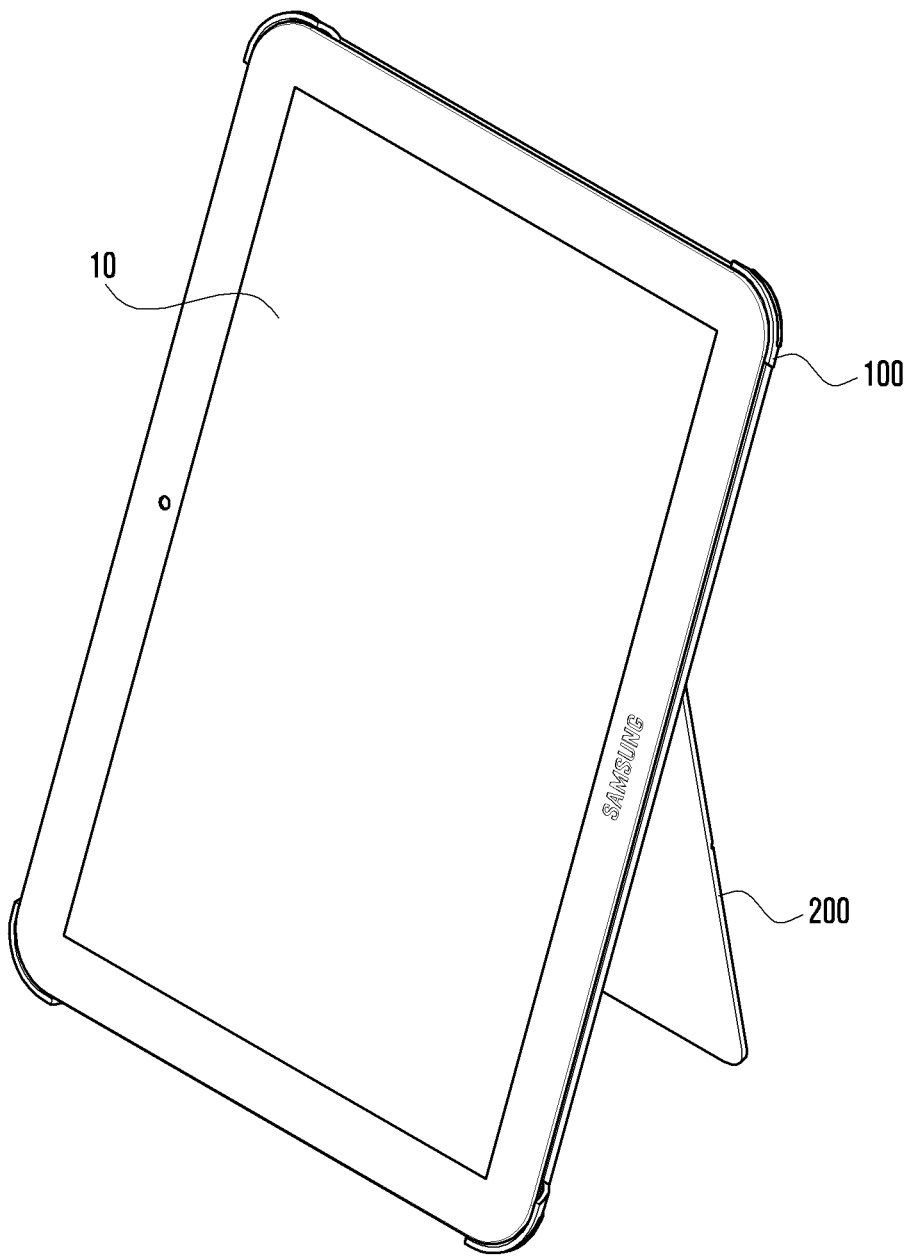
FIG. 10 is a perspective view illustrating a state that supports the mobile terminal when a support sheet is spread based on a first length groove line, seen at the front side of the protective cover of FIG. 7.

FIG. 9 is a perspective view illustrating a state that supports the mobile terminal when a support sheet 200 is spread based on a first length groove line W1 as seen at the rear side of the protective cover of FIG. 7. FIG. 10 is a perspective view illustrating a state that supports the mobile terminal when a support sheet is spread based on the first length groove line W1, seen at the front side of the protective cover of FIG. 7.

Referring to FIGS. 9 and 10, when the support sheet 200 is spread based on, for example the first length groove line W1, the support sheet 200 is divided into the upper lattice cells C1, C4, and C7 and the lower lattice cells C2, C3, C5, C6, C8, and C9. The upper lattice cells C1, C4, and C7 remain disposed within the recess, and the lower lattice cells C2, C3, C5, C6, C8, and C9 are separated from the recess. The lower lattice cells C2, C3, C5, C6, C8, and C9 spread from the recess contact with the surface below the mobile terminal 10. More particularly, an edge of the lower lattice cells C3, C6, and C9 adjacent to the surface below the mobile terminal 10 in the lower lattice cells C2, C3, C5, C6, C8, and C9 contacts with the ground.

In this embodiment, as the upper lattice cells C1, C4, and C7 contact both the protective cover 100 and simultaneously the lower lattice cells C2, C3, C5, C6, C8, and C9, the lattice cells C1-C9 in combination with the protective cover 100 at a predetermined angle, the support sheet 200 obliquely supports the mobile terminal 10. When the support sheet 200 is spread based on the first length groove line W1 and supports the mobile terminal 10, the support sheet 200 supports the mobile terminal 10 in a vertical direction.

In this embodiment, an angle in which the mobile terminal 10 is supported by the support sheet 200 may be adjusted according to a level in which the lower lattice cells C2, C3, C5, C6, C8, and C9 are spread from the recess. That is, as the lower lattice cells C2, C3, C5, C6, C8, and C9 are less spread from the recess, the mobile terminal 10 may be supported to an angle adjacent to vertical to the ground, and as the lower lattice cells C2, C3, C5, C6, C8, and C9 are much spread from the recess, the mobile terminal 10 may be supported to an angle adjacent to the ground.

FIGS. 9 and 10 illustrate an example of spreading the support sheet 200 based on the first length groove line W1, and the support sheet 200 may be spread based on the second length groove line W2 according to a height that supports the mobile terminal 10, and at least one of length groove lines W1 and W2 may be formed according to an exemplary embodiment without limitation of the number.

In this way, a protective cover for supporting in a dual direction and a multi angle according to the present exemplary embodiment can support the mobile terminal in several angles according to a user's various use and preference and can support the mobile terminal in a horizontal direction or a vertical direction, thereby enhancing user convenience.

Figure 11:
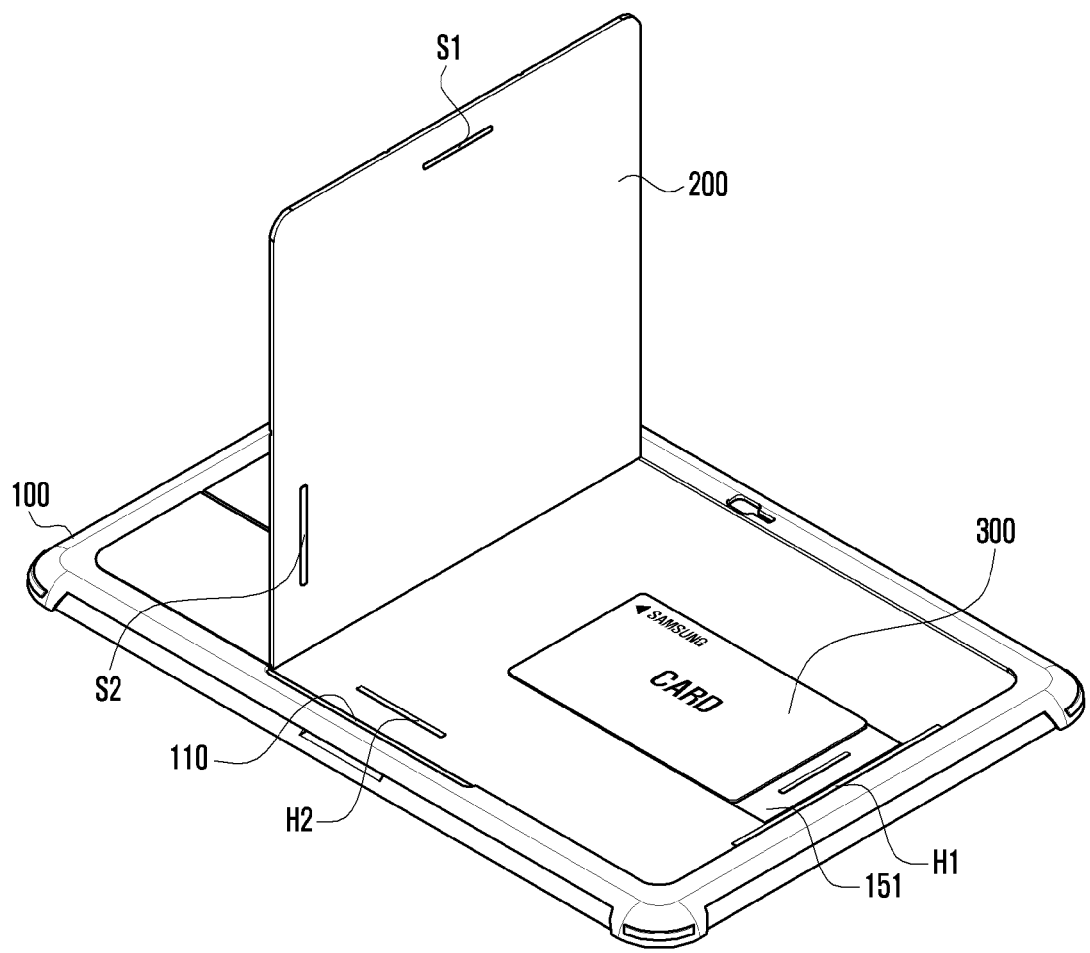
FIG. 11 is a perspective view illustrating a protective cover for supporting the mobile terminal in a dual direction and a multi angle according to another exemplary embodiment of the present invention.
Figure 12:
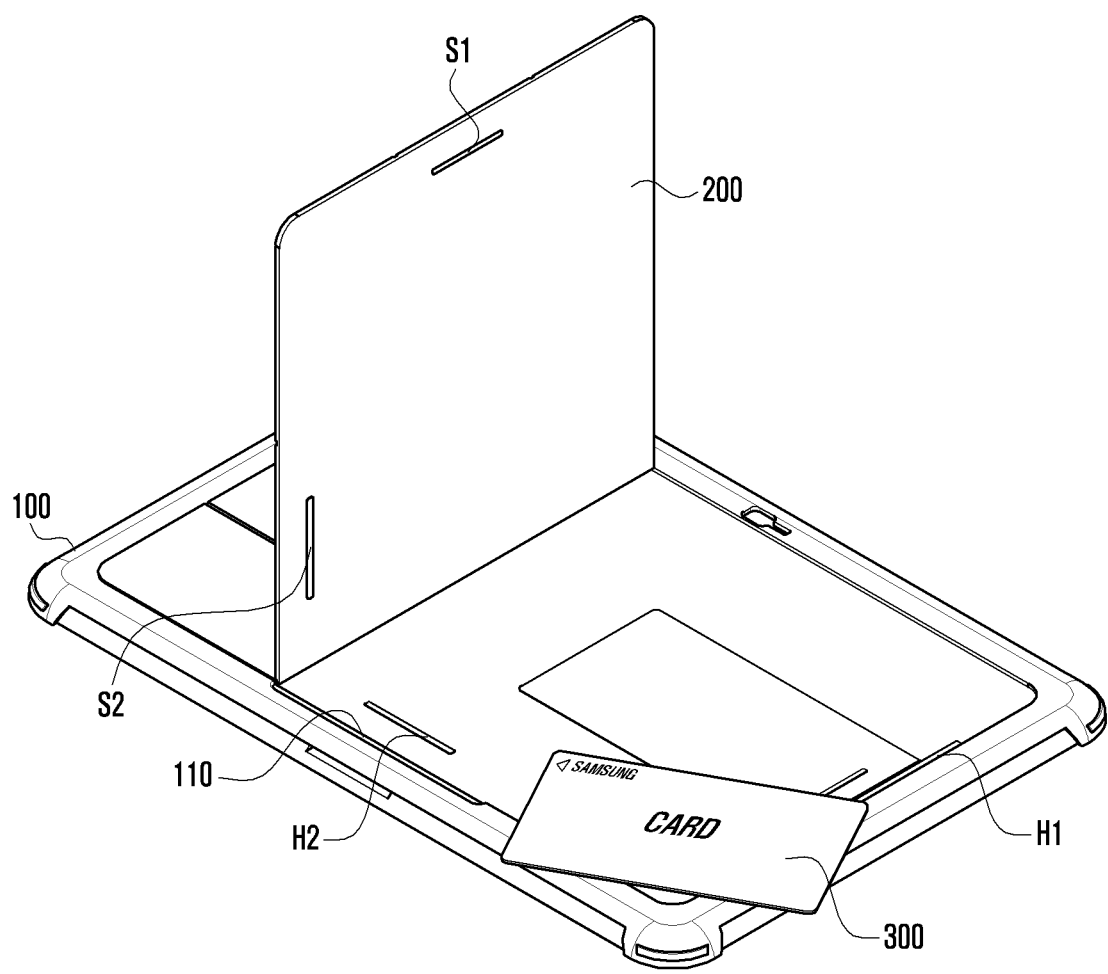
FIG. 12 is a perspective view illustrating a state in which an auxiliary card of the protective cover is withdrawn of FIG. 11.
Figure 13:
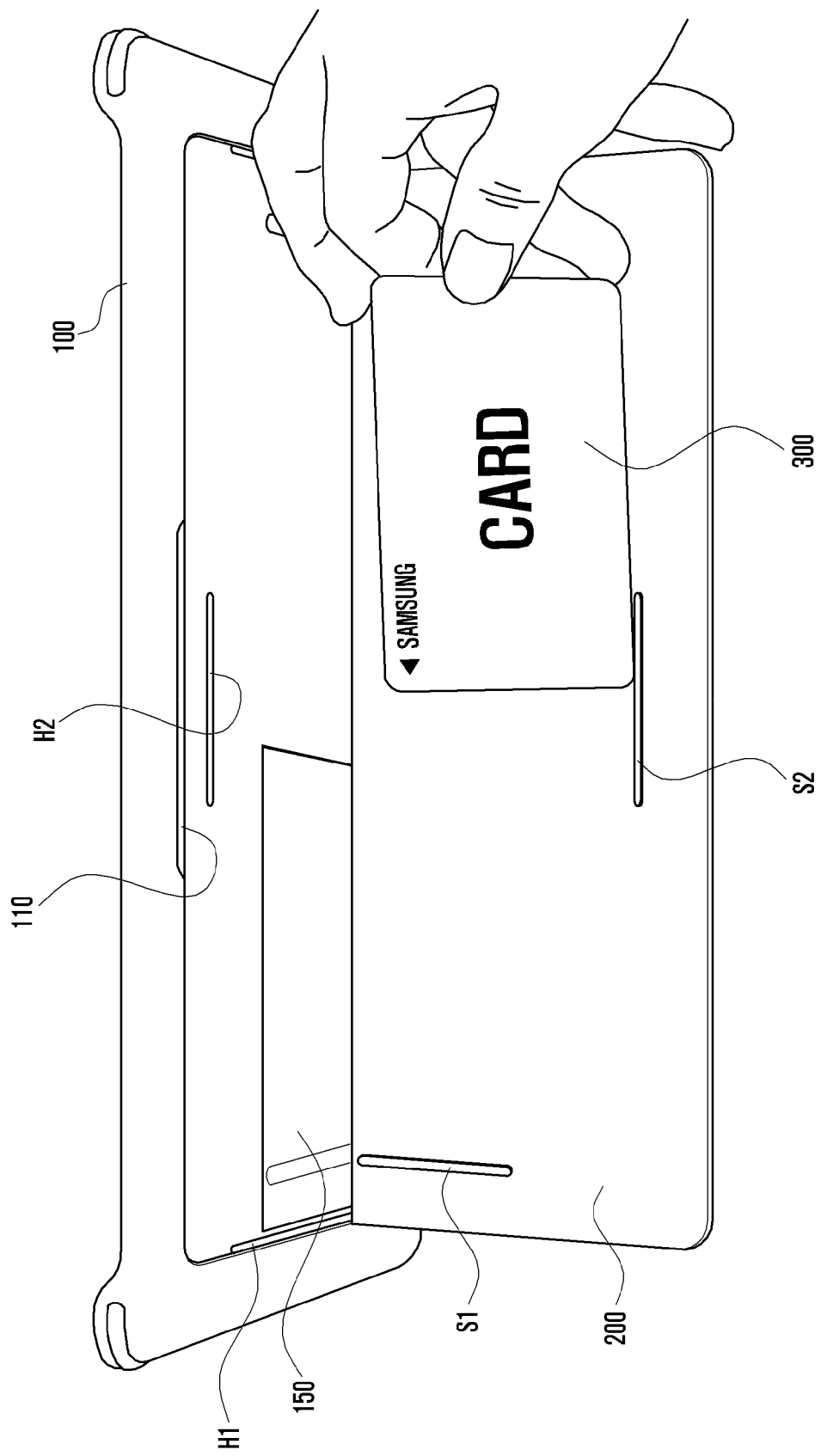
FIG. 13 is a perspective view illustrating a state in which an auxiliary card of the protective cover is inserted into a slot of FIG. 11.
Figure 14:
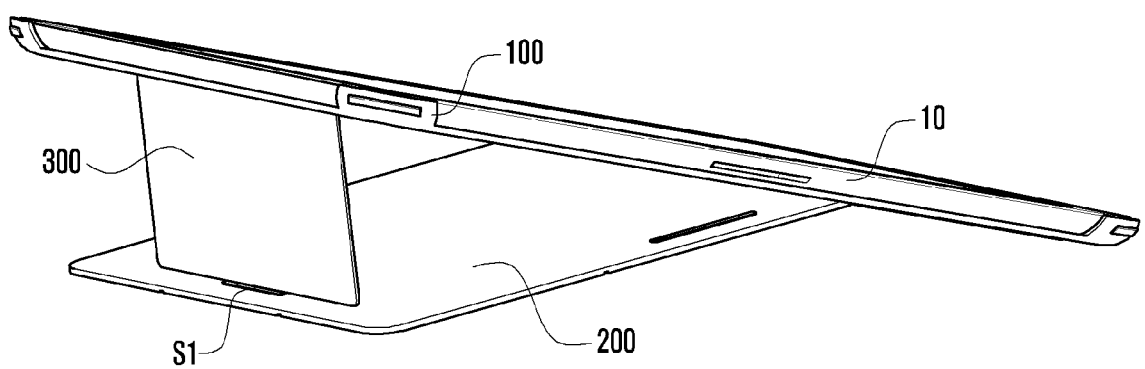
FIG. 14 is a perspective view illustrating a state in which an auxiliary card of the protective cover is stood by a slot and a protrusion opposite thereto and supports a mobile terminal of FIG. 11.

FIG. 11 is a perspective view illustrating a protective cover for supporting the mobile terminal in a dual direction and a multi angle according to another exemplary embodiment of the present invention. FIG. 12 is a perspective view illustrating a state in which an auxiliary card 300 of the protective cover is withdrawn from an auxiliary recess 150. FIG. 13 is a perspective view illustrating a state in which an auxiliary card 300 of the protective cover is inserted into a slot. FIG. 14 is a perspective view illustrating a state in which an auxiliary card 300 of a protective cover is stood up by a slot and a protrusion opposite thereto and supports a mobile terminal.

A protective cover for supporting in a dual direction and a multi angle according to another exemplary embodiment of the present invention shown in FIGS. 11 to 14 has a structure in which an auxiliary card 300 is further provided. Preferably, the auxiliary card 300 is positioned in the protective cover according to the foregoing exemplary embodiment of the present invention, and the same elements as the foregoing exemplary embodiment are denoted by the same reference numerals and a detailed description thereof will be omitted.

A protective cover for supporting in a dual direction and a multi angle according to another exemplary embodiment of the present invention further includes an auxiliary card positioned between the recess and the support sheet 200, and thus the support sheet 200 can support the mobile terminal 10 in a multi angle different from an angle in which the support sheet 200 supports the mobile terminal 10.

Hereinafter, a method of supporting the mobile terminal 10 using such an auxiliary card is described in detail with reference to FIGS. 11 to 14.

Referring to the embodiment shown in FIG. 11, the protective cover 100 can further include an auxiliary recess 150 and slots H1 and H2 in a partial area of a recess formed at an outer surface of a cover, and the support sheet 200 further includes protrusions S1 and S2 in an area opposite to the slots H1 and H2.

The auxiliary recess 150 has a structure recessed to a predetermined depth to mount an auxiliary card 300. The auxiliary recess 150 is preferably recessed to the same thickness as that of the auxiliary card 300, and is recessed in the same width and length as a width and a length of the auxiliary card 300. In an area adjacent to the auxiliary recess 150, an auxiliary groove 151 for withdrawing the auxiliary card 300 may be further provided.

When the auxiliary card 300 is stored, the auxiliary card 300 is preferably located in auxiliary recess 150, and located between the support sheet 200 and the recess. The auxiliary card 300 may be replaced with a user's credit card or identification card and the auxiliary card 300 may use a card in which a width and a length are different.

Alternatively, one side of the auxiliary card 300 can be hingedly fastened to a side of the auxiliary recess 150 to be rotatable. When the auxiliary card 300 is not being used, the auxiliary card 300 is stored completely in the auxiliary recess 150, and when the auxiliary card 300 is used, a fastened portion of the auxiliary card 300 rotates or pivots about the fastened end.

The slots H1 and H2 may be a boss or have a structure dented or depressed to a predetermined depth within a recess to insert any edge of the auxiliary card 300, and the protrusions S1 and S2 may be a structures protruded to a predetermined height from a portion of the support sheet 200 to latch an opposite edge of the auxiliary card 300 inserted into the slots H1 and H2.

When the auxiliary card 300 of this embodiment is used, the auxiliary card 300 is completely withdrawn from the auxiliary recess 150 and one end thereof is inserted into one of the slots H1 and H2. The opposite end of the auxiliary card 300 is to be stood up by being latched to one of the protrusions S1 and S2, as shown in FIG. 14, thereby and supporting the mobile terminal 10 in a predetermined angle.

Referring to FIG. 14 the auxiliary card 300 preferably contacts the surface below the mobile terminal 10 by separating the support sheet 200 from the recess in which the support sheet 200 is disposed.

By withdrawing the auxiliary card 300 from the auxiliary recess 150 and inserting one edge of the auxiliary card 300 into the first slot H1, the opposite edge of the one edge of the auxiliary card 300 is latched and stood up at the first protrusion S1. In this embodiment, as the auxiliary card 300 having a different width and length is stood up in a width or length direction, a height that supports the mobile terminal 10 may be differently adjusted. Further, by separating the support sheet 200 with the width groove lines L1 and L2 or the length groove lines W1 and W2, a support direction of the mobile terminal 10 may be determined.

In this way, a protective cover for supporting in a dual direction and a multi angle according to an exemplary embodiment of the present invention can support the mobile terminal in several angles according to a user's various use and preference and can support the mobile terminal in a horizontal or vertical direction, thereby enhancing user convenience.

As described above, a protective cover for supporting a mobile terminal in a dual direction and a multi angle is formed to spread a support sheet for supporting the mobile terminal in a lattice direction and supports the mobile terminal in various heights and angles using an auxiliary card, thereby supporting the mobile terminal in a multi direction and a multi angle.

Further, since a protective cover and a support sheet are attached and detached by removing magnetism, the protective cover and the support sheet can have minimal electrical and physical influence on the mobile terminal upon operating the mobile terminal, reliability can be improved.

Further, by mounting a support sheet in a recess formed at an external surface of the protective cover and by mounting an auxiliary card in a recess between an outer surface of the protective cover and a support sheet, a separate volume or thickness for a support apparatus is not requested and thus the apparatus can be formed in a small thickness and a production process can be simplified and thus a cost can be reduced.

Further, by mounting the support sheet and the auxiliary card to inside the recess, the support sheet and the protective cover can be conveniently carried and a simple external appearance can be provided.

Further, when carrying and storing the mobile terminal, a display can be protected using the protective cover, and when using the mobile terminal, by supporting the mobile terminal using the support sheet, the mobile terminal can be economically and easily manipulated.

Although exemplary embodiments of the present invention have been described in detail hereinabove, it should be clearly understood that many variations and modifications of the basic inventive concepts herein described, which may appear to those skilled in the art, will still fall within the spirit and scope of the exemplary embodiments of the present invention as defined in the appended claims.

What is claimed is:

1. A protective cover for supporting a mobile terminal in a dual direction and a multi angle, comprising:
a support sheet mounted in a recess of the protective cover formed at an outer surface of the protective cover; the support sheet comprising a plurality of groove lines formed in a lattice, the groove lines defining lattice cells, the support sheet mounted in the recess allowing a portion of the support sheet to be in contact with the protective cover and having the remaining portion of the support sheet separated from the protective cover for supporting the mobile terminal,
wherein the plurality of groove lines comprise a plurality of width groove lines formed in a horizontal direction and a plurality of length groove lines formed in a vertical direction.

2. The protective cover of claim 1, wherein the support sheet is configured to support the mobile terminal in a horizontal or vertical direction.

3. The protective cover of claim 1, wherein at least one lattice cell is attached and fixed to the recess.

4. The protective cover of claim 3, wherein the plurality of width groove lines are separated and engraved by a predetermined gap in a width direction and the plurality of length groove lines formed are separated and engraved by a predetermined gap in a length direction.

5. The protective cover of claim 4, wherein the groove lines between the lattice cells are hinges, allowing the lattice cells to be relatively rotated about the groove lines.

6. The protective cover of claim 4, wherein the support sheet is configured to be manipulated to separate a portion of the lattice cells from the recess, while the another portion of the lattice cells remain positioned in the recess.

7. The protective cover of claim 1, wherein the support sheet is rectangular in shape, having two short edges and two long edges, wherein the support sheet is capable of being maintained in the recess along one of a short edge and a long edge.

8. The protective cover of claim 3, wherein the support sheet is formed with material for integrally enclosing the plurality of lattice cells and groove line.

9. The protective cover of claim 8, wherein the material of the support sheet is formed with one of rubber, urethane, silicon, leather, and fiber.

10. The protective cover of claim 9, wherein the material of the support sheet comprises a pad at the inside corresponding only to the lattice cells.

11. The protective cover of claim 1, further comprising a pad for relieving an impact and preventing a sliding movement in a portion of an edge of the support sheet.

12. The protective cover of claim 1, wherein the recess has a thickness, width and length corresponding to the support sheet.

13. The protective cover of claim 1, wherein the recess further comprises an auxiliary groove depressed to a predetermined depth in a portion of an edge of the recess configured to permit separation of the support sheet at the auxiliary groove.

14. The protective cover of claim 1, wherein the outer surface of the protective cover further comprises:
an auxiliary recess formed to a predetermined depth at the inside of the recess;
an auxiliary card positioned in the auxiliary recess; and
a slot for positioning an edge of the auxiliary card at an edge area of the recess; and
a protrusion for supporting the auxiliary card in an area corresponding to the slot.

15. The protective cover of claim 14, wherein the slot is located in the recess of the protective cover and the protrusion is located in the support sheet, such that the auxiliary card can stand up by the slot and a protrusion to support the mobile terminal.

16. The protective cover of claim 14, wherein the auxiliary card may be withdrawn from the auxiliary recess.

17. The protective cover of claim 14, wherein the auxiliary card has one side rotatably fastened to one side of the auxiliary recess, is stored in a state close contacting with the auxiliary recess, when the auxiliary card is not used, and is separated from the auxiliary recess by a rotation of the fastened portion, when the auxiliary card is used.

18. The protective cover of claim 13, wherein the auxiliary recess has a structure recessed to the same thickness, length and width as auxiliary card.

19. The protective cover of claim 13, wherein the auxiliary recess further comprises an auxiliary groove having a structure for withdrawing the auxiliary card mounted in the auxiliary recess.

20. The protective cover of claim 1, wherein the support sheet further comprises rubber for relieving an impact and preventing pushing in a portion of an edge of at least one of the lattice cells when contacting with a surface below the mobile terminal.

21. The protective cover of claim 1, wherein at least one material of chamois, synthetic leather, and suede is attached to the inside of the protective cover that contacts a display of the mobile terminal.

* * * * *